United States Patent
Jan et al.

(10) Patent No.: US 11,042,581 B2
(45) Date of Patent: Jun. 22, 2021

(54) UNSTRUCTURED DATA CLUSTERING OF INFORMATION TECHNOLOGY SERVICE DELIVERY ACTIONS

(71) Applicant: International Business Machines Corporation, Armonk, NY (US)

(72) Inventors: Ea-Ee Jan, Ardsley, NY (US); Sarah White Eagle, Austin, TX (US); Jayashree Vaidyanathan, Cincinnati, OH (US)

(73) Assignee: International Business Machines Corporation, Armonk, NY (US)

( * ) Notice: Subject to any disclaimer, the term of this patent is extended or adjusted under 35 U.S.C. 154(b) by 124 days.

(21) Appl. No.: 16/026,723

(22) Filed: Jul. 3, 2018

(65) Prior Publication Data

US 2020/0012728 A1    Jan. 9, 2020

(51) Int. Cl.
  *G06F 16/00* (2019.01)
  *G06F 16/35* (2019.01)
  *G06N 20/00* (2019.01)

(52) U.S. Cl.
  CPC .......... *G06F 16/355* (2019.01); *G06N 20/00* (2019.01)

(58) Field of Classification Search
  None
  See application file for complete search history.

(56) References Cited

U.S. PATENT DOCUMENTS

| | | | |
|---|---|---|---|
| 9,250,993 B2 | 2/2016 | Mani et al. | |
| 9,299,031 B2 * | 3/2016 | Jan .................. | G06N 5/048 |
| 9,477,963 B2 * | 10/2016 | Kar ................... | G06F 40/284 |
| 9,582,408 B1 * | 2/2017 | Jayaraman ........ | G06N 20/00 |
| 10,438,212 B1 * | 10/2019 | Jilani ............... | G06Q 10/20 |
| 2008/0177736 A1 * | 7/2008 | Spangler ........... | G06F 16/355 |
| 2016/0110723 A1 | 4/2016 | Shimpi et al. | |
| 2016/0378859 A1 | 12/2016 | Banik et al. | |
| 2017/0212756 A1 | 7/2017 | Ryali et al. | |
| 2017/0262297 A1 | 9/2017 | Hosabettu et al. | |
| 2018/0211260 A1 * | 7/2018 | Zhang ............... | G06N 20/00 |
| 2018/0240125 A1 * | 8/2018 | Karuppasamy ..... | G06F 16/285 |
| 2019/0130415 A1 * | 5/2019 | Cheah ............... | G06Q 10/04 |

OTHER PUBLICATIONS

Clustering and Labeling IT Maintenance Tickets, Roy et al. Springer International Publishing Switzerland 2016, pp. 829-845.*
Roy et al. "Clustering and Labeling IT Maintenance Tickets", Service-Oriented Computing, Sep. 20, 2016, pp. 829-845 (Year: 2016).*

* cited by examiner

*Primary Examiner* — Debbie M Le
(74) *Attorney, Agent, or Firm* — Patterson + Sheridan, LLP

(57) ABSTRACT

Systems, methods, and computer program products relating to clustering unstructured data. A set of unstructured documents is tokenized to produce a plurality of tokens. A frequency at which terms appear in the plurality of tokens is analyzed, to generate a vocabulary of terms. A vocabulary indices matrix is generated based on the generated vocabulary of terms. The matrix relates to the set of unstructured documents. A plurality of rows in the vocabulary indices matrix are matched to generate a plurality of clusters for the set of unstructured documents.

19 Claims, 11 Drawing Sheets

UNSTRUCTURED DATA CLUSTERING OF INFORMATION TECHNOLOGY SERVICE DELIVERY ACTIONS

BACKGROUND

The present disclosure relates to machine learning, and more specifically, to data clustering related to machine learning.

Many Information Technology (IT) departments manage IT problems using a system involving tickets. Many of the tickets are generated automatically by IT monitoring systems. For example, an IT department can establish templates for various types of issues, and use those templates to automatically generate tickets relating to the issues. Alternatively, tickets can be created manually, with or without templates. IT tickets created using templates are often structured similarly, following the templates. These similarly structured tickets are then resolved by IT personnel. But resolving IT tickets individually, without considering the structural similarity of the tickets, can be inefficient.

SUMMARY

Embodiments described herein include a computer implemented method of clustering unstructured data. The method includes tokenizing, using a computer processor, a set of unstructured documents to produce a plurality of tokens. The method further includes analyzing, using the computer processor, a frequency at which terms appear in the plurality of tokens to generate a vocabulary of terms. The method further includes generating, using the computer processor, a vocabulary indices matrix, relating to the set of unstructured documents, based on the generated vocabulary of terms. The method further includes matching, using the computer processor, a plurality of rows in the vocabulary indices matrix to generate a plurality of clusters for the set of unstructured documents.

Embodiments described herein further include a system. The system includes a processor and a memory storing a program, which, when executed on the processor, performs an operation. The operation includes tokenizing a set of unstructured documents to produce a plurality of tokens. The operation further includes analyzing a frequency at which terms appear in the plurality of tokens to generate a vocabulary of terms. The operation further includes generating a vocabulary indices matrix, relating to the set of unstructured documents, based on the generated vocabulary of terms. The operation further includes matching a plurality of rows in the vocabulary indices matrix to generate a plurality of clusters for the set of unstructured documents.

Embodiments described herein further include a computer program product for clustering unstructured data, the computer program product including a computer-readable storage medium having computer-readable program code embodied therewith, the computer-readable program code executable by one or more computer processors to perform an operation. a memory storing a program, which, when executed on the processor, performs an operation. The operation includes tokenizing a set of unstructured documents to produce a plurality of tokens. The operation further includes analyzing a frequency at which terms appear in the plurality of tokens to generate a vocabulary of terms. The operation further includes generating a vocabulary indices matrix, relating to the set of unstructured documents, based on the generated vocabulary of terms. The operation further includes matching a plurality of rows in the vocabulary indices matrix to generate a plurality of clusters for the set of unstructured documents.

DETAILED DESCRIPTION

Figure 1:
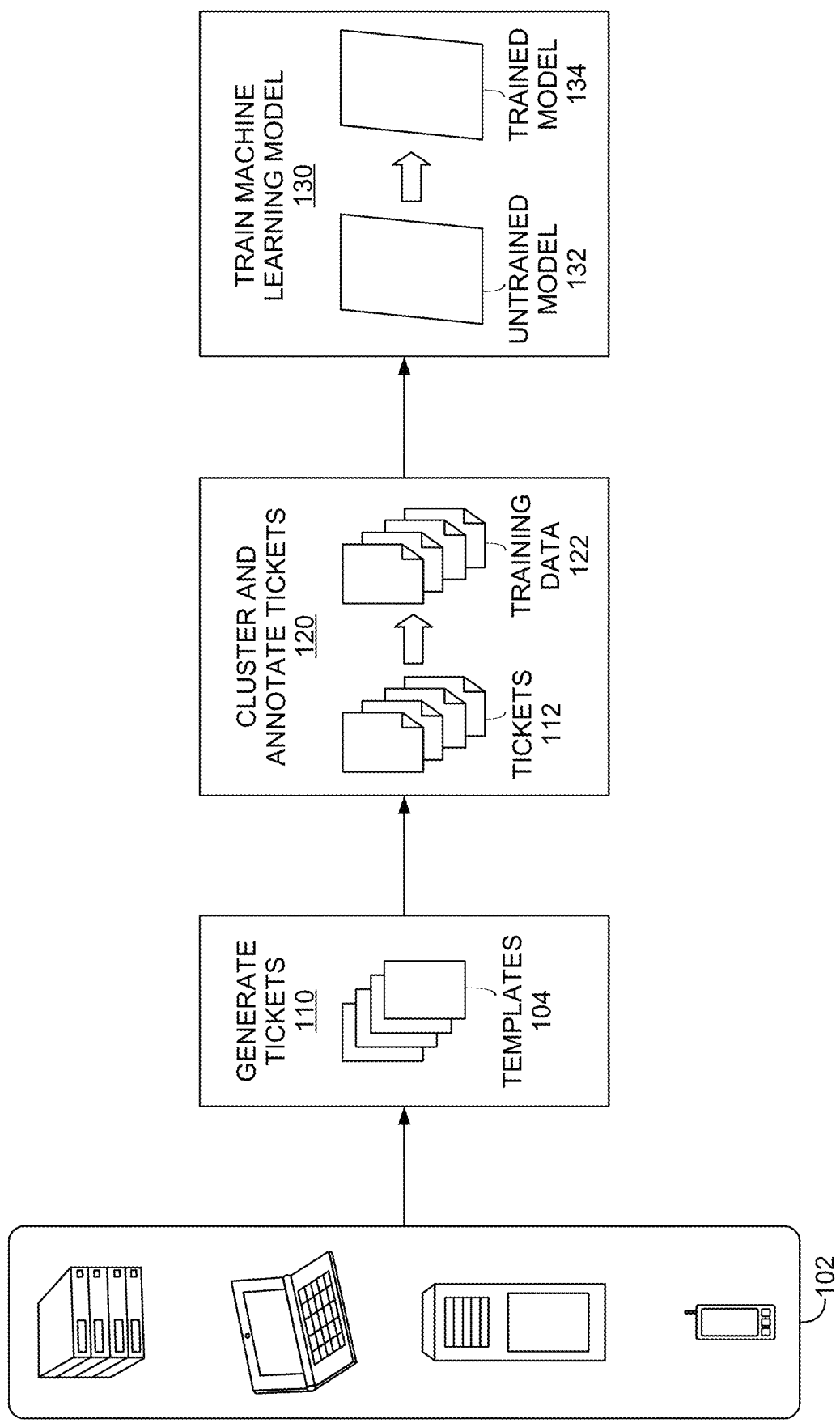
FIG. 1 is a block diagram illustrating training of a machine learning model to classify IT tickets, according to an embodiment.

IT tickets generated using templates should, in theory, be good candidates for grouping into clusters. Clustered tickets can more easily be routed to appropriate personnel or organizations, and can be automatically resolved. The IT templates used to generate the tickets may not be available, however, when generating the clusters. For example, an outside vendor may be asked to help improve IT processes, but may not have access to the IT ticket templates. Alternatively, an IT vendor may wish to pitch improved processes to a potential customer, but may not have access to the templates being used by the potential customer.

An algorithm to cluster similar IT tickets, without requiring access to the IT templates, can dramatically improve IT service delivery. For example, a machine learning model can be used to classify incoming IT tickets. The classifications can be used to automatically resolve the tickets—particular classifications of tickets can be provided to automata and automatically resolved. Existing IT tickets can be clustered to create training data for use in supervised learning to train the machine learning model.

As another example, clustering previously issued IT tickets can allow an organization to improve automatic resolution of IT tickets. Identifying the categories of tickets, and the prevalence of each category, allows the IT organization to develop automated processes for the categories of tickets for which automation would be most beneficial. For example, the up-front expense of developing an automatic resolution for a particular category of ticket might be cost-effective only if a sufficient number of that type of ticket are seen in the system. Clustering the similar tickets can allow an IT organization to determine the types of tickets in the system, and how frequently each type of ticket occurs.

As another example, dynamic clustering of IT tickets can improve routing of in-process tickets. IT tickets can be classified based on clusters, and can be routed to the appropriate destination for resolution. That destination could be an automatic process designed to resolve that type of ticket. Alternatively, the destination can be a particular group of IT professionals equipped to resolve that type of ticket. As a final example, an IT vendor can use dynamic clustering of IT tickets to estimate the benefit to customers of an improved system. An IT vendor might offer to a customer an improved IT system with automatic resolution of tickets. Clustering the IT tickets allows the vendor to provide the potential customer with a concrete estimate of how many (and which) tickets are candidates for automatic resolution, and how much the customer's IT system can be improved.

In an embodiment, techniques like k-means clustering and hierarchical clustering could be used to cluster IT tickets. However, this can be slower than desired, particularly when dealing with a relatively large data set. In another embodiment, according to one or more embodiments disclosed herein, clustering can be done accurately, and rapidly, even on relatively large data sets. For example, approximately one million IT tickets could be clustered in several minutes using techniques disclosed herein, rather than the several hours likely to be required for k-means clustering. Further, techniques disclosed herein may be more effective than k-means clustering. The quality of a cluster can be calculated by comparing the variance within the cluster, and clusters generated using the disclosed techniques are generally of higher quality than would be achieved using k-means clustering or hierarchical clustering.

FIG. 1 is a block diagram illustrating training of a machine learning model to classify IT tickets, according to an embodiment. An organization (e.g., a corporation, non-profit organization, hospital, university, school, etc.) has a number of IT devices 102. These devices can include server computers, desktop personal computers, laptop personal computers, mobile devices like smart phones and tablets, and any other type of IT device.

When one of the IT devices 102 encounters an error or issue, a ticket 112 is generated—as illustrated at the generate tickets block 110. In an embodiment, these tickets 112 can be generated using a collection of templates 104. For example, the tickets 112 can be generated automatically using the templates 104 when one of the IT devices 102 encounters an issue, or when an issue is reported. Alternatively, at least some of the tickets 112 can be generated manually, with or without using the collection of templates 104. In an embodiment, all of the tickets 112 are generated using the collection of templates 104. In another embodiment, only some of the tickets 112 are generated using the collection of templates 104, while others are generated without using the collection of templates 104. In another embodiment, at least some of the tickets 112 are generated manually without the use of the templates 104, but following a standard notation so that tickets for comparable errors follow a similar format.

For example, a disk in one of the IT devices 102 running out of space might trigger an error or exception. A template 104 could be used in generate tickets block 110 to automatically generate a ticket 112 describing the disk space error. The template 104 could be configured to include numerous fields relating to the error in the ticket 112, like the IP or MAC address of the IT device 102, the ID or name of the disk that triggered the error, the type of disk triggering the error, the manufacturer of the disk triggering the error, the amount of remaining disk space, a timestamp, etc. Similarly, high CPU utilization at an IT device 102 could trigger an error or exception, and the generate tickets block 110 could similarly use a template tied to that type of error to generate a ticket 112. Because at least some of the tickets 112 for each type of error are generated using the same template 104 (or the same manual format), the tickets for each type of error will be structured similarly.

At block 120, the tickets 112 are clustered and annotated for training a machine learning model 132. As will be described in more detail with respect to FIGS. 4-7, the tickets 112 can be clustered using one or more specific algorithms. Existing clustering algorithms are generally slow, and require selecting a number of clusters before running the algorithm. For example, k-means clustering can be used to cluster unstructured data, but the number of clusters must be chosen before running the algorithm, and even then the algorithm is generally slow (e.g., on the order of a number of hours for a million records). The same is generally true of other known algorithms, like hierarchical clustering. This disclosure describes improved algorithms to cluster unstructured data. This can be used in block 120 to generate training data 122 from raw tickets 112.

At block 130, the training data 122 is used to train an untrained machine learning model 132 and generate a trained model 134. This is described in more detail, below, with regard to block 408 illustrated in FIG. 4. For example, in supervised machine learning, it is often very difficult to generate appropriate training data to use in training the machine learning model. The clustering algorithms described in FIGS. 4-7 can be used to take raw IT tickets and cluster them into groups. These clusters can then be annotated with attribute values, and the annotated data can be used (e.g., by the training engine 326) to generate and update a trained machine learning model 134. As described in FIG. 3, the trained model 134 can then be used to classify newly generated IT tickets.

In an embodiment, the classes output by the trained model 134 can be automata for automated resolution of the IT tickets 112. For example, the trained model 134 can take as input an IT ticket, and can output identifying information for an automata that could be used to automatically resolve the ticket. This is discussed in more detail with regard to block 220 in FIG. 2.

Figure 2:
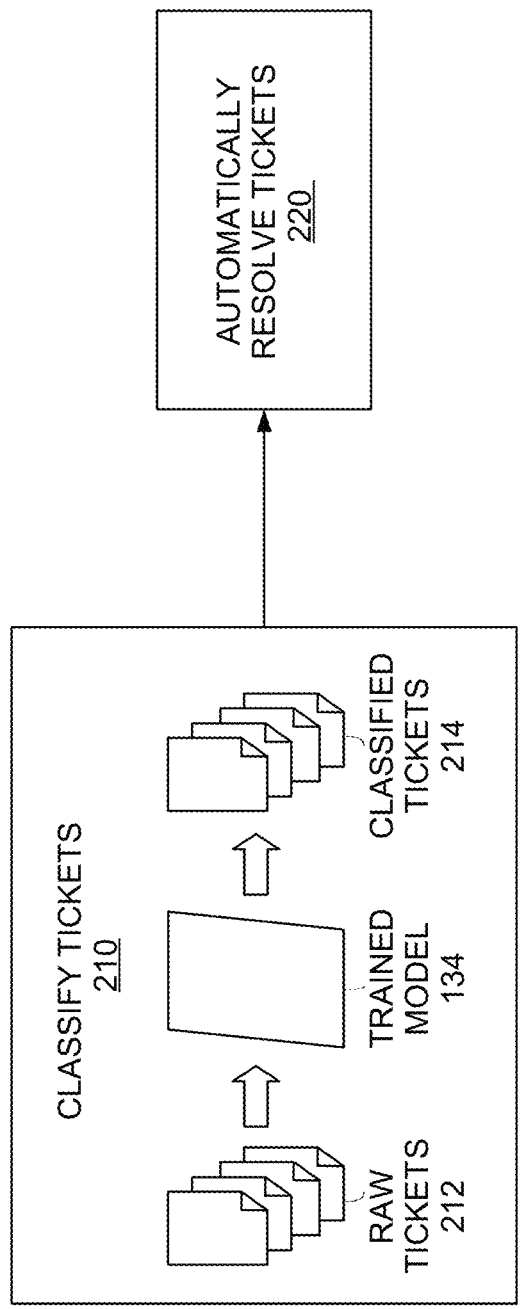
FIG. 2 is a block diagram illustrating classification and resolution of IT tickets, according to an embodiment.

FIG. 2 is a block diagram illustrating classification and resolution of IT tickets, according to an embodiment. The block 210 illustrates classifying the IT tickets. A collection of raw tickets 212 is provided to the trained machine learning model 134. In an embodiment, the trained model 134 is illustrated in FIG. 1 and was trained using the process illustrated in FIG. 1. Alternatively, the trained model 134 can be another suitable trained machine learning model, trained using a different process.

The block 220 illustrates automatically resolving the classified tickets 214. In an embodiment, dynamic automation technology can be used to automatically resolve particular classifications of tickets. In an embodiment, the classified tickets 214 relate to automata used for automated resolution of the tickets. For example, classified tickets 214 that relate to high CPU utilization could be resolved automatically by, for example, automata that improve CPU utilization or bring additional CPU resources online. Many different classifications of tickets can potentially be resolved automatically, including: (1) high CPU utilization, (2) host or node down, (3) high disk utilization, (4) failed backups, (5) high swap or page space usage, (6) service down, (7) process handler problems, (8) agent offline or busy, (9) database connection errors, etc. These are merely examples of possible ticket classifications that can be resolved automatically at block 220. A person having ordinary skill in the art will know of additional ticket classifications that can be resolved automatically. Further, in another embodiment, the classes of the classified tickets 214 can relate to different features other than automation. For example, the classes could relate to particular routing designations for the tickets 214 (e.g., particular IT employees or departments suited to resolve that ticket).

Figure 3:
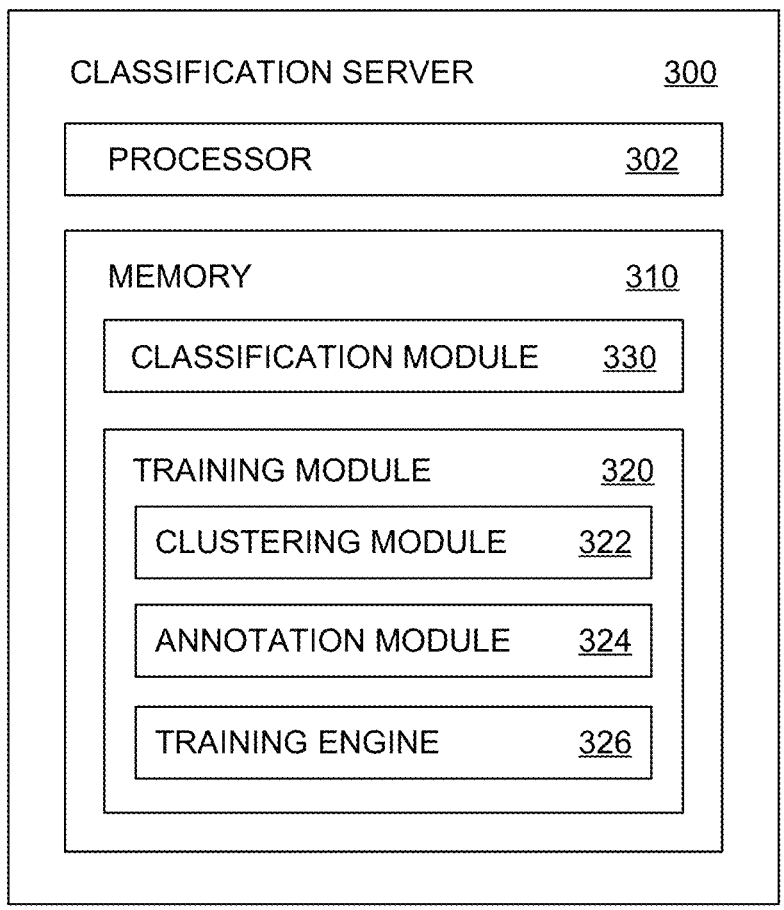
FIG. 3 is a block diagram illustrating a classification server, according to an embodiment.

FIG. 3 is a block diagram illustrating a classification server 300, according to an embodiment. In the illustrated embodiment of FIG. 3, the classification server 300 is depicted as a single server. But in other implementations, the classification server 300 can be made up of many different connected computers (e.g., connected over a communication network or via a direct connection). Further, as discussed below with regard to FIGS. 9 and 10, the classification server 300 can be provided to end users through a cloud computing infrastructure. The classification server 300 includes a processor 302. The processor 302 generally retrieves and executes programming instructions stored in the memory 310. The processor 302 is included to be representative of a single central processing unit (CPU), multiple CPUs, a single CPU having multiple processing cores, graphics processing units (GPUs) having multiple execution paths, and the like. The memory 310 is generally included to be representative of electronic storage of any suitable type(s), including random access memory or non-volatile storage.

The memory 310 generally includes program code for performing various functions related to classifying IT tickets, using machine learning. The program code is generally described as various functional "applications," "components," or "modules" within the memory 310, although alternate implementations may have different functions and/or combinations of functions. Within the memory 310, the training module 320 is generally configured to train a machine learning model (e.g., the untrained model 132 illustrated in FIG. 1) to classify IT tickets. The training module 320 includes a clustering module 322. The clustering module 322 is generally configured to cluster the IT tickets. This is illustrated, for example, in block 120 of FIG. 1. It is further discussed with regard to FIGS. 4 and 5.

The training module 320 further includes an annotation module 324. The annotation module 324 is generally configured to annotate the clustered IT tickets. This is illustrated, for example, in block 120 of FIG. 1. It is further discussed with regard to FIG. 4. The training module 320 further includes a training engine 326. The training engine 326 is generally configured to train a machine learning model (e.g., the untrained model 132 illustrated in FIG. 1) to generate a trained model (e.g., the trained model 134 illustrated in FIG. 1). This is illustrated, for example, in block 130 of FIG. 1. It is further discussed with regard to FIG. 4.

The memory 310 further includes a classification module 330. The classification module 330 is generally configured to classify IT tickets using a trained machine learning model (e.g., the trained model 134 illustrated in FIG. 1). This is illustrated, for example, in block 210 of FIG. 2. It is further discussed with regard to FIG. 4.

Figure 4:
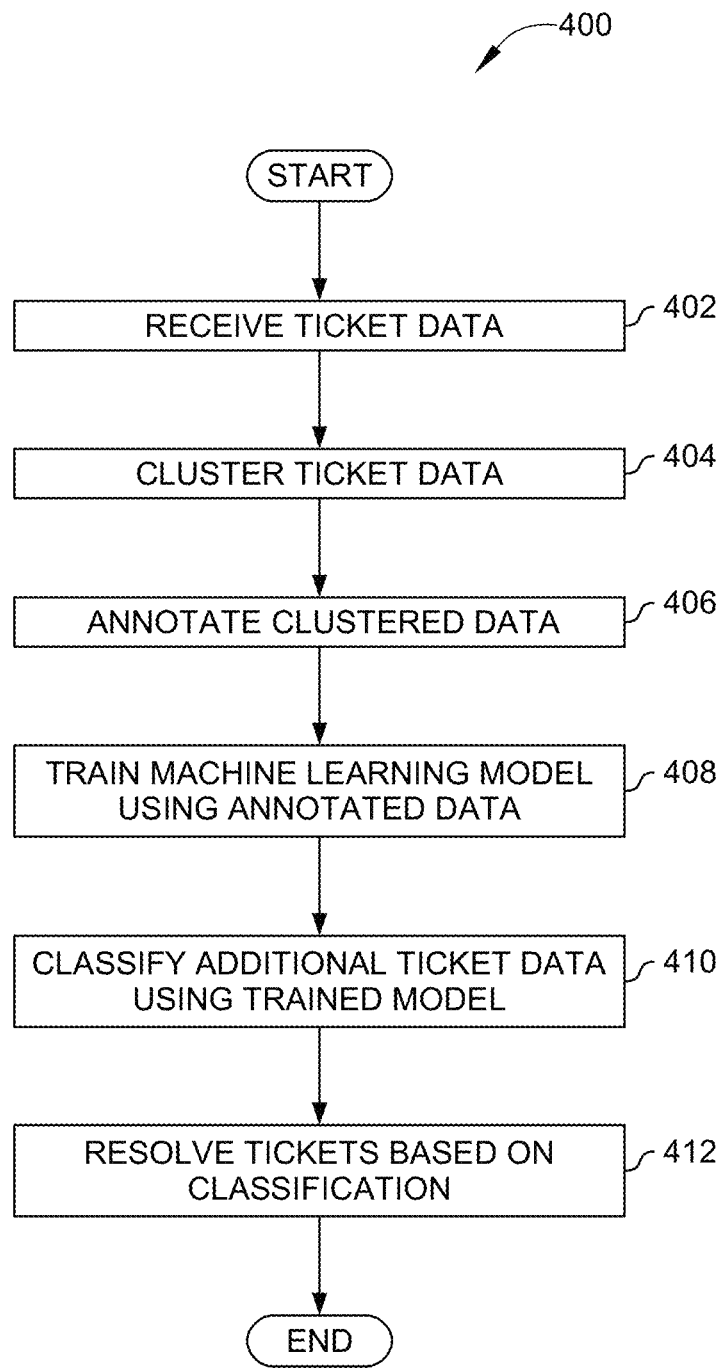
FIG. 4 is a flow chart illustrating training a machine learning model and using it to classify and resolve IT tickets, according to an embodiment.

FIG. 4 is a flow chart illustrating training a machine learning model and using it to classify and resolve IT tickets, according to an embodiment. At block 402, a clustering module (e.g., the clustering module 322 illustrated in FIG. 3) receives the ticket data. In an embodiment, this data is unstructured. Alternatively, the data can be partially structured through prior electronic or human analysis. As used herein, the term "unstructured" can include entirely unstructured data as well as partially structured data. As discussed above with regard to FIG. 1, the tickets can be generated using a number of templates (e.g., the templates 104 illustrated in FIG. 3).

At block 404, the clustering module (e.g., the clustering module 322) clusters the received ticket data. This is discussed in more detail with regard to FIG. 5. At block 406, the annotation module (e.g., the annotation module 324) annotates the clusters output after block 404. In an embodiment, the annotation module 324 can identify automata to use in automatically resolving each cluster of IT tickets. In addition, or alternatively, the annotation module 324 can identify routing destinations for each cluster. Further, the annotation module 324 can annotate the various clusters using other suitable classification information.

In an embodiment, the annotation can be done by knowledgeable IT employees, using the annotation module 324. The employee(s) can review the generated clusters and annotate each cluster appropriately (e.g., identifying the automata to automatically resolve the ticket, identifying the routing destination, or identifying another classification). Because the employee is reviewing clustered tickets, the employee need only annotate each cluster once, rather than annotating each and every ticket. This saves significant time in the automation process.

Alternatively, the annotation module 324 can automatically annotate the clusters output after block 404. For example, the clusters could be annotated using keyword matching or other natural language processing techniques. Further, a machine learning model could be used to annotate the clusters. For example, a machine learning model could be trained using common IT templates and clusters, along with available automata, and used to generate the annotations.

At block 408, the training engine (e.g., the training engine 326 illustrated in FIG. 3) trains a machine learning model (e.g., the untrained model 132 illustrated in FIG. 1) using the annotated tickets as training data. In an embodiment, the untrained model 132 is trained using supervised machine learning, sometimes also referred to as trained machine learning. Supervised machine learning generally refers to machine learning that utilizes exemplars and pre-determined attribute scores to train the model.

For example, a corpus of training data can be converted into feature vectors. These feature vectors are provided to a model training component (e.g., the training engine 326), along with a set of associated attribute values (e.g., the annotations output after block 406). That is, the training data is associated with one or more attribute values for the principle attributes used by the system, wherein each of the one or more attribute values represents a measure of an attribute indicated by the corresponding training data. The training engine 326 uses supervised machine learning techniques to generate and update a trained machine learning model 134, which can then be used to process new electronic data. Any suitable machine learning technique can be used. In embodiments, classification techniques can be used to classify the IT tickets into various classes. As one example, logistic regression techniques could be used. Alternatively, regression techniques (or other suitable techniques, including neural networks, deep learning, decision trees, etc.) could be used. Further, as discussed above, the resultant classes can be automata used to automatically resolve the tickets, routing destinations associated with the tickets, or other suitable classes.

In an embodiment, IT ticket data from a particular customer or IT organization can be used by the training engine 326 to train the machine learning model 132. The resulting trained machine learning model 134 can then be used to classify additional tickets for that customer or IT organization. In another embodiment, IT ticket data from across multiple customers or IT organizations can be used by the training engine 326 to train the machine learning model 132. This can improve the robustness of the trained model 134, allowing it to better classify unseen data. Training the model 132 using data across multiple customers or IT organizations can be especially beneficial when limited sample training data is available for a particular client or IT organization.

At block 410, the trained machine learning model (e.g., the trained model 134 illustrated in FIG. 1) is used to classify additional ticket data. For example, the classification module 330 illustrated in FIG. 3 can be used to take additional ticket data and classify it using the trained model 134. In an embodiment, each input IT ticket can be classified based on an automata suitable to automatically resolve the ticket, a routing destination for an employee or department to resolve the ticket, or another suitable classification.

At block 412, the classified tickets are automatically resolved using automata. In an embodiment, the additional tickets are classified at block 410 into classes based on available automata for automatic resolution of the tickets. After a ticket is classified, it can be provided to the relevant automata, which can automatically resolve the ticket. For example, as discussed above, an example IT ticket might relate to high CPU usage. At block 410, this example IT ticket could be classified into a classification related to resolution of high CPU usage. The example IT ticket could then be provided to an automata configured to resolve high CPU usage, and the automata could automatically resolve the ticket (e.g., by providing additional CPU resources or clearing out unnecessary CPU resources).

Further, in addition (or instead) of automatically resolving tickets based on classification, the classifications output after block 410 could be used to improve the footprint for automated resolution of IT tickets. For example, it may become apparent after classifying IT tickets that a number of tickets relate to a particular class of IT problem. If no automata has been configured to automatically resolve this IT problem, a new automata could be created and used to resolve the problem. In this example, a new script or automated procedure could be created and used to resolve the identified problem. This allows for a significant improvement in the efficiency and effectiveness of automatic resolution of IT tickets. And, as discussed above, where automatic resolution is not available or not suitable for a particular class of IT ticket, the ticket could be routed to a particular employee or organization for resolution.

Figure 5:
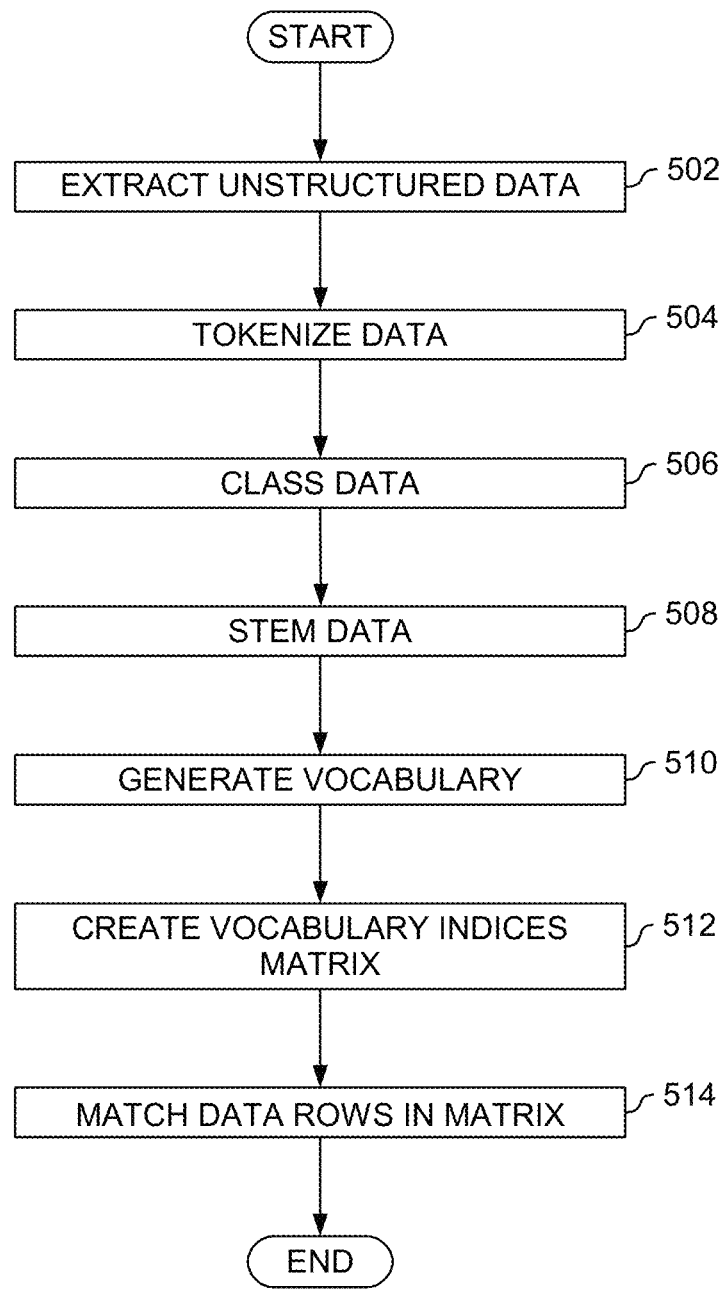
FIG. 5 is a flow chart illustrating clustering of unstructured IT tickets, according to an embodiment.

FIG. 5 is a flow chart illustrating clustering of unstructured IT tickets, according to an embodiment. In an embodiment, this corresponds to block 404 illustrated in FIG. 4. At block 502, a clustering module (e.g., the clustering module 322 illustrated in FIG. 3) extracts unstructured data from a ticket. In an embodiment, the ticket includes an abstract and a description, and data is extracted from both portions. Alternatively, the ticket could include more, or fewer, portions. At block 406, a clustering module (e.g., the clustering module 322 illustrated in FIG. 3) tokenizes the data. In an embodiment, the clustering module 322 can remove and normalize punctuation, remove and normalize capitalization, etc. For example, the clustering module 322 can tokenize the string "St. Peter St." into three tokens: "saint," "peter," and "street."

At block 506, a clustering module (e.g., the clustering module 322 illustrated in FIG. 3) classes the data is classed. In an embodiment, data that fits a particular pattern can be converted into a class. For example, the clustering module 322 can perform date-time and number classing. In this example, the clustering module 322 can convert the string "2/23/2016" into the class DATE, the string "02:23:45" into the class TIME, and the string "234-456" into the class "NUMBER." As another example, the clustering module 322 can perform server name and IP address classing. In this example, the string "s3.ibm.com" could be converted into the class "SERVERNAME," while the string "128.128.0.1" could be converted into the class "IPADD." Other popular patterns can similarly be classed, including e-mail, URL, street address, etc. After classing, the original string is replaced with the corresponding class, to facilitate clustering by finding similarities between strings.

At block 508, a software module (e.g., the clustering module 322 illustrated in FIG. 3, or another suitable module) stems the data. In an embodiment, the module can stem the data by removing suffixes from words, further increasing the similarity between IT tickets. While block 508 is illustrated in FIG. 5, this block is optional. At block 510, a clustering module (e.g., the clustering module 322 illustrated in FIG. 3) generates a vocabulary. In an embodiment, the clustering module 322 extracts significant tokens from the data as a vocabulary. This block is discussed in more detail with regard to FIG. 6.

At block 512, a clustering module (e.g., the clustering module 322 illustrated in FIG. 3) creates a vocabulary indices matrix. In an embodiment, the clustering module 322 creates a matrix of vectors relating to the tokens in each IT ticket. This is discussed in more detail with regard to FIG. 7. At block 514, a clustering module (e.g., the clustering module 322 illustrated in FIG. 3) clusters the data by matching data rows in the vocabulary indices matrix. In an embodiment, the clustering module 322 compares rows in the vocabulary indices matrix, and groups similar rows into clusters. In an embodiment, the clustering module 322 identifies each cluster based on exact matches of rows in the vocabulary indices matrix—that is, rows in the vocabulary indices matrix that match exactly are grouped into a cluster. Alternatively, the clustering module 322 can identify clusters based on similarity (but not an exact match), between rows in the vocabulary indices matrix. In an embodiment, the clustering module 322 outputs a cluster only if it includes a minimum number of rows (e.g., only clusters with more than 10 rows are output). Alternatively, the clustering module 322 outputs all clusters, regardless of the number of rows in the cluster.

Figure 6:
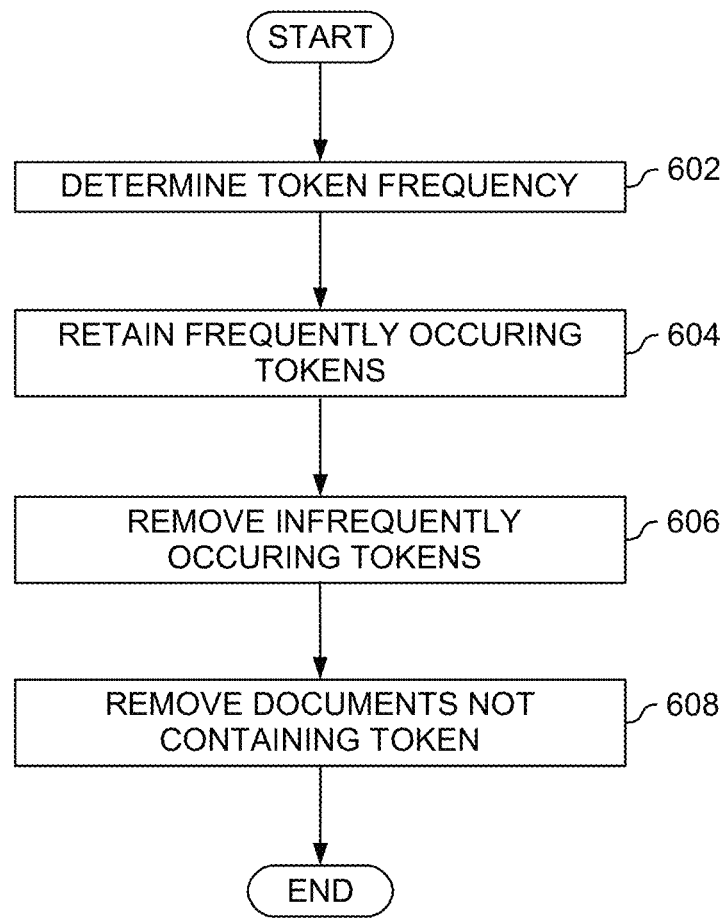
FIG. 6 is a block diagram illustrating generating a vocabulary for clustering of unstructured IT tickets, according to an embodiment.

FIG. 6 is a block diagram illustrating generating a vocabulary for clustering of unstructured IT tickets, according to an embodiment. At block 602, a clustering module (e.g., the clustering module 322 illustrated in FIG. 3) determines the token frequency. As discussed above with regard to FIGS. 4 and 5, the clustering module 322 tokenizes and classes the IT ticket data. At block 602, the clustering module 322 calculates a frequency for each classed token. At block 604 frequently occurring tokens are retained and at block 606 infrequently occurring tokens are removed. Both blocks 602 and 604 can be performed, for example, by the clustering module 322.

In an embodiment, the clustering module 322 retains frequent tokens in the vocabulary and removes a percentage of the least frequently occurring tokens from the vocabulary. In an embodiment, this percentage is a hyperparameter, and can be pre-defined. For example, the percentage can be adjusted based on a particular data set. For example, the clustering module 322 can determine the frequency percentile for each token in the data set, and remove the bottom 20% of tokens from the vocabulary. In this embodiment, removing a percentage of tokens may be preferred over removing a fixed number, because the size of the data set is not known. Alternatively, a fixed number of tokens could be removed from the vocabulary. The less frequently used tokens are removed from the vocabulary to improve clustering—infrequent words are less likely to be associated with a cluster (or an originating IT ticket template) and so can be removed from consideration.

In an embodiment, the tokens accounting for the desired percentage of tokens in the data set are retained in the vocabulary. For example, if 80% of tokens are to be retained and 20% of tokens are to be removed, then the tokens necessary to account for 80% of tokens in the data set are retained in the vocabulary. That is, in this embodiment 20% of unique tokens are not necessarily removed—the number of tokens necessary to account for the bottom 20% of the tokens occurring in the data set are removed. For example, it is often true that some words occur much more frequently than others. In English language usage, 20% of words often account for approximately 80% of content. Assuming this example applied to a vocabulary, if 1,000 tokens, total, are present, 200 unique tokens might account for 80% of the token occurrences in the data set. In this instance, 800 unique tokens could be removed from the vocabulary, accounting for 20% of the token occurrences in the data set (because the remaining 200 would represent 80% of the token occurrences in the data set).

At block 608, a clustering module (e.g., the clustering module 322 illustrated in FIG. 3) removes from the data set any documents not containing a token in the vocabulary. For example, assume a particular IT ticket in the data set contained only infrequently occurring tokens. The clustering module 322 removes these tokens from the vocabulary at block 606. At block 608, the clustering module 322 removes the IT ticket from the data set because the document does not contain a token in the vocabulary.

Figure 7:
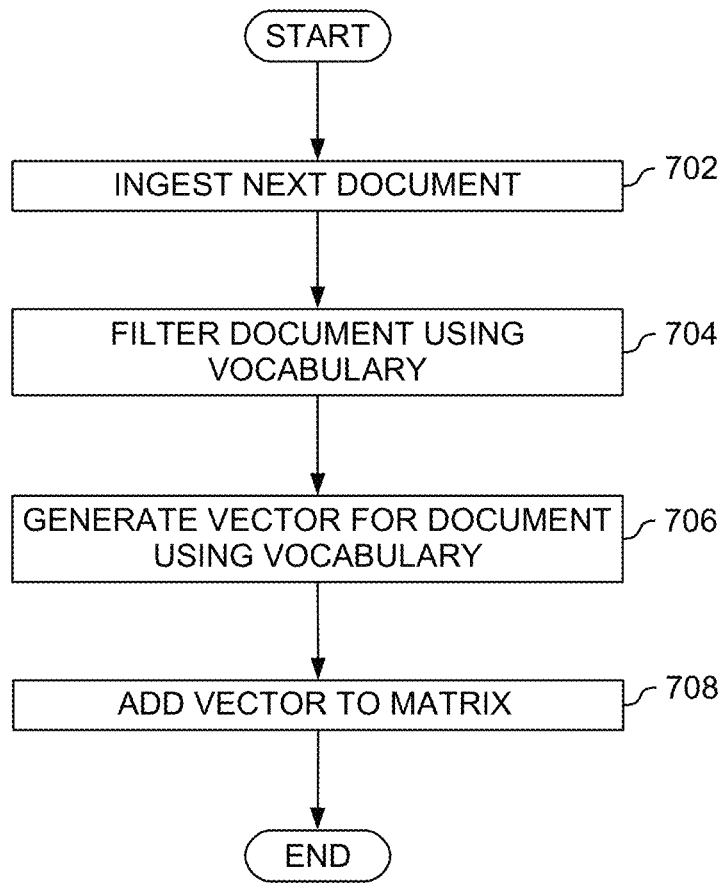
FIG. 7 is a block diagram illustrating creating a vocabulary indices matrix for clustering of unstructured IT tickets, according to an embodiment.

FIG. 7 is a block diagram illustrating creating a vocabulary indices matrix for clustering of unstructured IT tickets, according to an embodiment. At block 702, a clustering module (e.g., the clustering module 322 illustrated in FIG. 3) ingests the next IT ticket as a document. In an embodiment, each IT ticket can be treated as a document. At block 704, the clustering module 322 filters the document using the vocabulary generated at block 510. In an embodiment, the clustering module 322 filters the document to remove tokens not occurring in the vocabulary. At block 706 the clustering module (e.g., the clustering module 322 illustrated in FIG. 3) generates a vector for the document, using the vocabulary.

At block 708, the clustering module (e.g., the clustering module 322 illustrated in FIG. 3) adds the vector to the vocabulary indices matrix.

In an embodiment, the clustering module 322 can generate a bit vector indicating which vocabulary terms are present in the document and which are not. In this embodiment, an order for tokens in the vocabulary is pre-set. This order is used to generate the bit vector. Table 1, below, illustrates an example vocabulary indices matrix for five IT tickets.

TABLE 1

| Ticket ID | word1 | word2 | word3 | word4 | word5 | word6 | word7 |
|---|---|---|---|---|---|---|---|
| t0001 | 1 | 0 | 0 | 0 | 1 | 1 | 0 |
| t0002 | 1 | 0 | 0 | 0 | 1 | 1 | 0 |
| t0003 | 1 | 0 | 0 | 0 | 1 | 0 | 1 |
| x0005 | 0 | 0 | 0 | 1 | 1 | 1 | 1 |
| x0008 | 1 | 0 | 0 | 0 | 0 | 0 | 0 |

For example, in Table 1, each 1 or 0 indicates whether that vocabulary term is present in the IT ticket. In this example, the vocabulary includes seven words. The ticket t0001 includes vocabulary words 1, 5, 6, and 7, and does not include vocabulary words 2, 3, and 4. The ticket t0002 includes exactly the same vocabulary words. The clustering module 322 would mark tickets t0001 and t0002 as matches, because their associated bit vectors are identical. The embodiment discussed above uses a bit vector but this is merely an example. In other embodiments, alternative data structures could be used (e.g., a vector of strings, a vector of integers, etc.).

Figure 8:
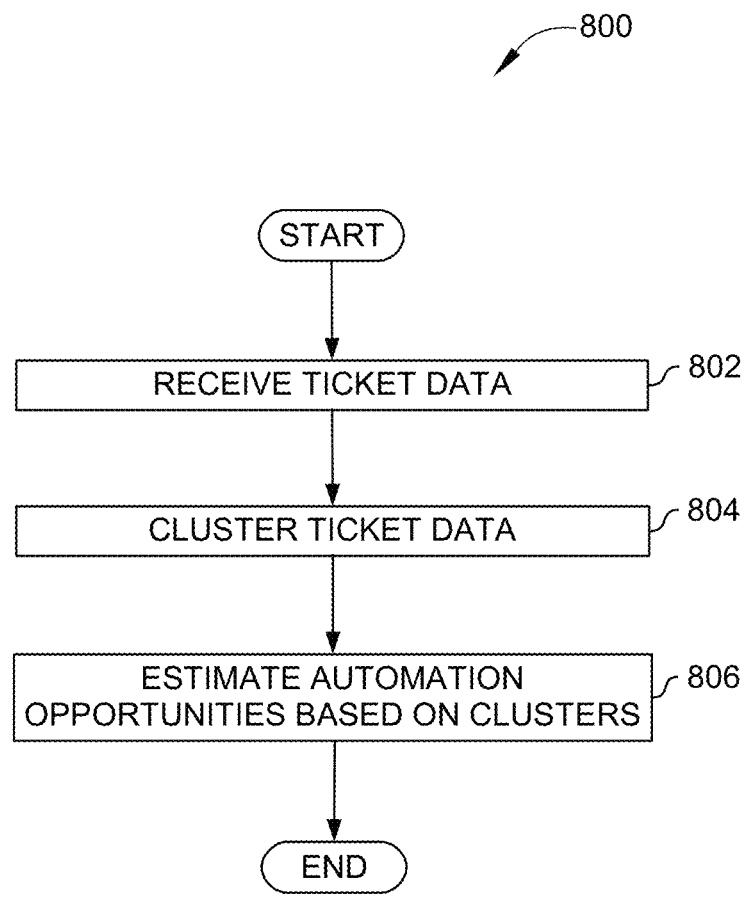
FIG. 8 is a flow chart illustrating clustering IT tickets to estimate IT automation opportunities, according to an embodiment.

FIG. 8 is a flow chart illustrating clustering IT tickets to estimate IT automation opportunities, according to an embodiment. As discussed above with regard to FIG. 4, one use of the clustering technique described with regard to FIGS. 5-7 is in generating clusters for annotation to use as training data for a machine learning model. Alternatively, or in addition, these clustering techniques can be used to estimate automation opportunities when presenting IT services to a potential customer (or for other purposes).

At block 802, the clustering module (e.g., the clustering module 322) receives the IT ticket data. At block 804, the clustering module (e.g., the clustering module 322) clusters the ticket data. This is discussed in more detail, above, with regard to FIGS. 5-7 and will not be repeated here. At block 806, these clusters are used to estimate opportunities to automatically resolve IT issues. For example, a company offering IT services might wish to explain to a potential customer how valuable the offered IT services could be. But without knowledge of the customer's specific IT templates and tickets, this can be very difficult. The clustering techniques described with regard to FIG. 5 can be used to quickly analyze a potential customer's IT tickets and cluster them. The company offering IT services can then quickly analyze the clusters and estimate which can be automatically resolved.

Embodiments herein have been discussed with regard to analyzing IT tickets. But this is merely an example of the data that can be analyzed using the techniques disclosed herein. Other suitable data types, including any textual or string data generated using a number of templates, can also be analyzed. For example, this data can be clustered using the techniques illustrated in FIGS. 5-7, and can be classified using a machine learning model (as illustrated with regard to FIG. 4).

Figure 9:
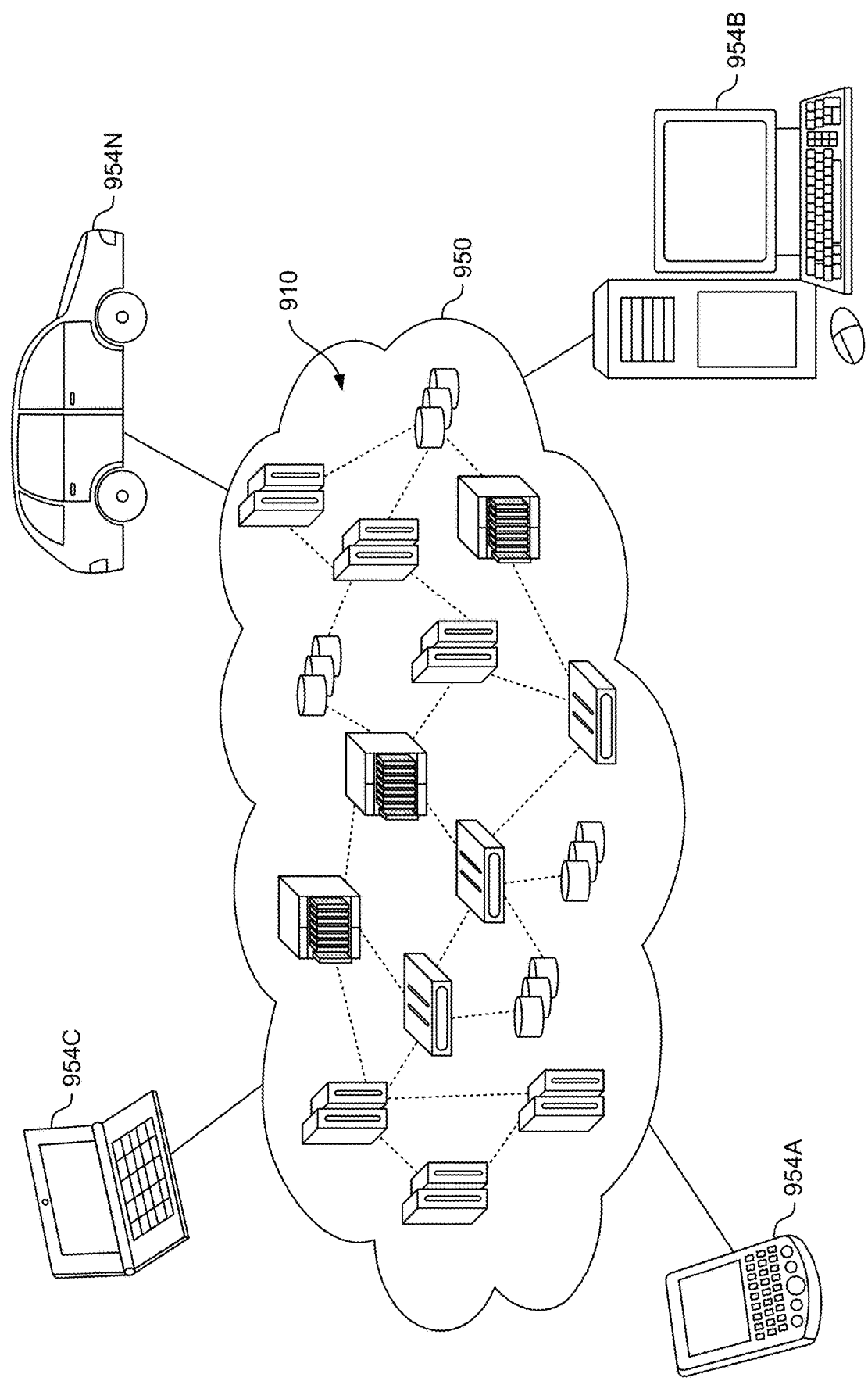
FIG. 9 depicts a cloud computing environment, according to an embodiment.

FIG. 9 depicts a cloud computing environment, according to an embodiment. It is to be understood that although this disclosure includes a detailed description on cloud computing, implementation of the teachings recited herein are not limited to a cloud computing environment. Rather, embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 9, illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
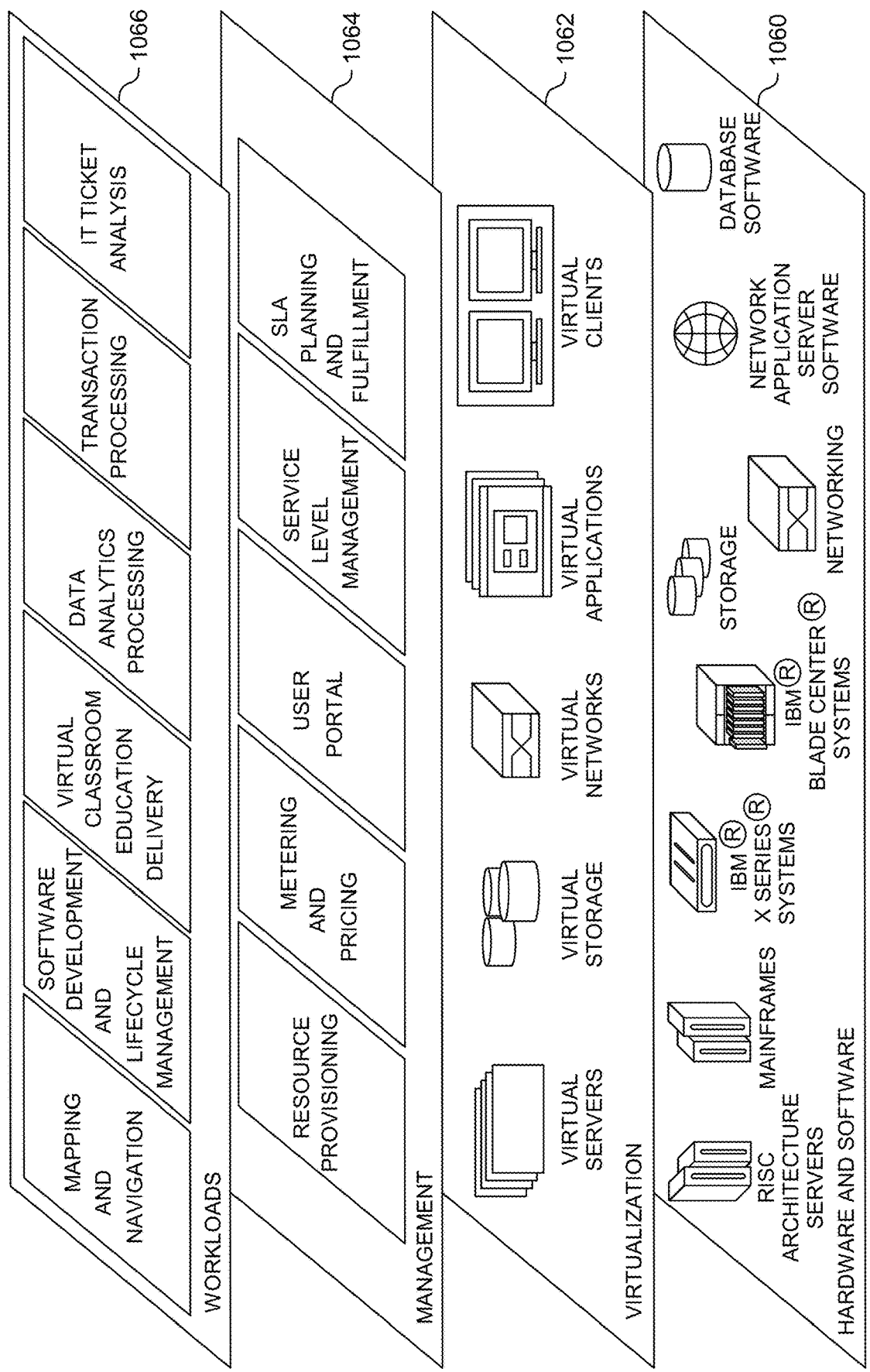
FIG. 10 depicts abstraction model layers, according to an embodiment.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes; RISC (Reduced Instruction Set Computer) architecture based servers; servers; blade servers; storage devices; and networks and networking components.

In some embodiments, software components include network application server software and database software.

Virtualization layer 1062 provides an abstraction layer from which the following examples of virtual entities may be provided: virtual servers; virtual storage; virtual networks, including virtual private networks; virtual applications and operating systems; and virtual clients.

In one example, management layer 1064 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1066 provides examples of functionality for which the cloud computing environment may be utilized. Examples of workloads and functions which may be provided from this layer include: mapping and navigation; software development and lifecycle management; virtual classroom education delivery; data analytics processing; transaction processing; and IT ticket analysis. In an embodiment, some or all of the modules of the classification server 300 could be implemented in the workloads layer 1066. For example, the training module 320 and the classification module 330 could be implemented in the workloads layer 1066. In an embodiment, the training module 320 and the classification module 330 could execute on a computing system in the cloud (e.g., in the workloads layer 1066) and analyze IT ticket data stored on the cloud. In such a case, annotated training data and classified data (along with related data) could be stored at a storage location in the cloud. Doing so allows access to this information from any computing system attached to a network connected to the cloud (e.g., the Internet).

Figure 11:
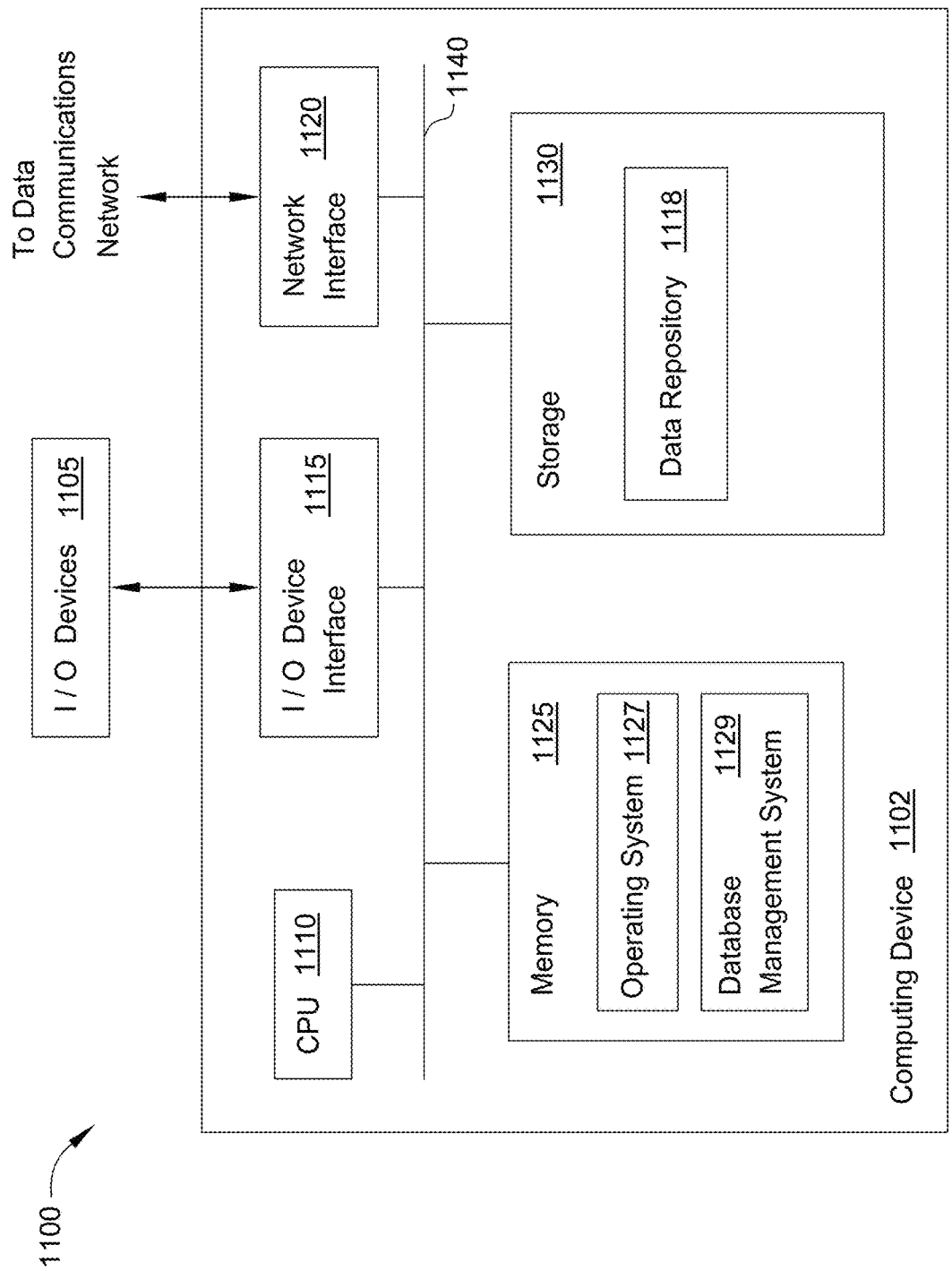
FIG. 11 is a block diagram illustrating a computing device, according to an embodiment.

FIG. 11 illustrates a computing environment 1100 for classification and resolution of IT tickets, according to one embodiment. As shown, computing device 1102 includes, without limitation, a central processing unit (CPU) 1110, a network interface 1120, a memory 1125, and storage 1130, each connected to a bus 1140. In an embodiment, the computing device 1102 is the classification server 300 illustrated in FIG. 3. Alternatively, the computing device 1102 is another computing device for classification and resolution of IT tickets. The computing device 1102 also includes an I/O device interface 1115 for connecting to I/O devices 1105 (e.g., keyboard, display and mouse devices) in the environment 1100. Further, in context of this disclosure, the computing elements shown in the computing device 1105 may correspond to a physical computing system (e.g., a system in a data center) or may be a virtual computing instance executing within a computing cloud (as discussed more, above, with regard to FIGS. 9 and 10).

CPU 1110 retrieves and executes programming instructions stored in memory 1125 as well as stores and retrieves application data residing in the storage 1130. For example, the CPU 1110 can correspond with the processor 302 illustrated in FIG. 3, the memory 1125 can correspond with the memory 310 illustrated in FIG. 3, and the CPU 1110 can execute the classification module 330, the training module 320, the clustering module 322, the annotation module 324, and the training engine illustrated in FIG. 3. The bus 1140 is used to transmit programming instructions and application data between CPU 1110, I/O devices interface 1105, storage 1130, network interface 1120, and memory 1125. Note, CPU 1110 is included to be representative of a single CPU, multiple CPUs, a single CPU having multiple processing cores, and the like. Memory 1125 is generally included to be representative of a random access memory. Storage 1130 may be a disk drive storage device. Although shown as a single unit, storage 1130 may be a combination of fixed and/or removable storage devices, such as fixed disc drives, removable memory cards, network attached storage (NAS), or a storage area-network (SAN).

Illustratively, memory 1125 includes an operating system 1127 and a database management system (DBMS) 1129, while storage 1130 includes a data repository 1118 (e.g., a database). Further, as discussed above, the memory 1125 can include the additional modules described above with regard to FIG. 3. The operating system 1127 generally controls the execution of application programs on the computing device 1105. Examples of operating system 1127 include, without limitation, versions of UNIX, distributions of the Linux® operating system, versions of Microsoft® Windows® and so on. The DBMS 1129 generally facilitates the capture and analysis of data in the data repository 1118 (e.g., IT tickets and training data). For instance, the DBMS 1129 could enable the definition, creation, querying, update and administration of the data repository 1118. As an example, the DBMS 1129 could receive a query (e.g., composed using Structured Query Language (SQL) and, in response, could generate an execution plan that includes one or more access routines to be run against the data repository 1118. The DBMS 1129 could then execute the access routine(s) and could return any query result data to the requestor.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer implemented method of clustering unstructured data comprising:
    tokenizing, using a computer processor, a set of unstructured documents to produce a plurality of tokens;
    analyzing, using the computer processor, a frequency at which terms appear in the plurality of tokens to generate a vocabulary of terms;
    generating, using the computer processor, a vocabulary indices matrix, relating to the set of unstructured documents, based on the generated vocabulary of terms; and
    matching, using the computer processor, a plurality of rows in the vocabulary indices matrix to generate a plurality of clusters for the set of unstructured documents, wherein each row in the plurality of rows is associated with a different document in the set of unstructured documents, and wherein matching the plurality of rows comprises:
        comparing a first row, of the plurality of rows, relating to a first document with a second row, of the plurality of rows, relating to a second document; and
        generating a first cluster comprising the first document and the second document, based on determining that the first row matches the second row using a predefined matching criteria.

2. The method of claim 1, further comprising:
    generating a set of training data for a machine learning model using the generated plurality of clusters.

3. The method of claim 2, further comprising:
    training the machine learning model using the set of training data; and
    classifying an additional unstructured document, not present in the set of unstructured documents, using the trained machine learning model.

4. The method of claim 3, wherein the set of unstructured documents comprises a set of IT tickets, and wherein the additional unstructured document comprises an additional IT ticket, the method further comprising:
    identifying a procedure for automatic resolution of the additional IT ticket, based on the classification using the trained machine learning model.

5. The method of claim 4, further comprising:
    automatically resolving the additional IT ticket using the identified procedure.

6. The method of claim 1, wherein analyzing the frequency at which terms appear in the plurality of tokens to generate a vocabulary of terms further comprises:
    identifying a frequency threshold below which terms should be excluded from the vocabulary;
    identifying a first term, of the plurality of terms appearing in the plurality of tokens, for which the frequency with which the term appear in the plurality of tokens falls below the frequency threshold; and
    excluding the first term from the vocabulary of terms.

7. The method of claim 1, further comprising:
    generating a modified plurality of tokens by replacing at least one token, of the plurality of tokens, with a class value, by matching the token value to a pattern associated with the class value, wherein the vocabulary of terms is generated based on the modified plurality of tokens.

8. The method of claim 1, wherein
    determining that the first row matches the second row using a predefined matching criteria comprises determining that values in the first row match values in the second row.

9. The method of claim 1, wherein each row in the vocabulary indices matrix is a bit vector.

10. The method of claim 1, wherein the set of unstructured documents comprises a set of IT tickets, further comprising:
    estimating a number of IT tickets suitable for automatic resolution using the generated plurality of clusters.

11. A system, comprising:
    a processor; and
    a memory storing a program, which, when executed on the processor, performs an operation, the operation comprising:
        tokenizing a set of unstructured documents to produce a plurality of tokens;
        analyzing a frequency at which terms appear in the plurality of tokens to generate a vocabulary of terms;
        generating a vocabulary indices matrix, relating to the set of unstructured documents, based on the generated vocabulary of terms; and
        matching a plurality of rows in the vocabulary indices matrix to generate a plurality of clusters for the set of unstructured documents, wherein each row in the plurality of rows is associated with a different document in the set of unstructured documents, and wherein matching the plurality of rows comprises:
            comparing a first row, of the plurality of rows, relating to a first document with a second row, of the plurality of rows, relating to a second document; and
            generating a first cluster comprising the first document and the second document, based on determining that the first row matches the second row using a predefined matching criteria.

12. The system of claim 11, the operation further comprising:
    generating a set of training data for a machine learning model using the generated plurality of clusters;
    training the machine learning model using the set of training data; and
    classifying an additional unstructured document, not present in the set of unstructured documents, using the trained machine learning model.

13. The system of claim 12, wherein the set of unstructured documents comprises a set of IT tickets, and wherein the additional unstructured document comprises an additional IT ticket, the operation further comprising:
    identifying a procedure for automatic resolution of the additional IT ticket, based on the classification using the trained machine learning model.

14. The system of claim 11, wherein analyzing the frequency at which terms appear in the plurality of tokens to generate a vocabulary of terms further comprises:
    identifying a frequency threshold below which terms should be excluded from the vocabulary;
    identifying a first term, of the plurality of terms appearing in the plurality of tokens, for which the frequency with which the term appear in the plurality of tokens falls below the frequency threshold; and
    excluding the first term from the vocabulary of terms.

15. A computer program product for clustering unstructured data, the computer program product comprising:
a computer-readable storage medium having computer-readable program code embodied therewith, the computer-readable program code executable by one or more computer processors to perform an operation, the operation comprising:
tokenizing a set of unstructured documents to produce a plurality of tokens;
analyzing a frequency at which terms appear in the plurality of tokens to generate a vocabulary of terms;
generating a vocabulary indices matrix, relating to the set of unstructured documents, based on the generated vocabulary of terms; and
matching a plurality of rows in the vocabulary indices matrix to generate a plurality of clusters for the set of unstructured documents, wherein each row in the plurality of rows is associated with a different document in the set of unstructured documents, and wherein matching the plurality of rows comprises:
comparing a first row, of the plurality of rows, relating to a first document with a second row, of the plurality of rows, relating to a second document; and
generating a first cluster comprising the first document and the second document, based on determining that the first row matches the second row using a predefined matching criteria.

16. The computer program product of claim 15, the operation further comprising:
generating a set of training data for a machine learning model using the generated plurality of clusters;
training the machine learning model using the set of training data; and
classifying an additional unstructured document, not present in the set of unstructured documents, using the trained machine learning model.

17. The computer program product of claim 15, wherein the set of unstructured documents comprises a set of IT tickets, and wherein the additional unstructured document comprises an additional IT ticket, the operation further comprising:
identifying a procedure for automatic resolution of the additional IT ticket, based on the classification using the trained machine learning model; and
automatically resolving the additional IT ticket using the identified procedure.

18. The computer program product of claim 15, wherein analyzing the frequency at which terms appear in the plurality of tokens to generate a vocabulary of terms further comprises:
identifying a frequency threshold below which terms should be excluded from the vocabulary;
identifying a first term, of the plurality of terms appearing in the plurality of tokens, for which the frequency with which the term appear in the plurality of tokens falls below the frequency threshold; and
excluding the first term from the vocabulary of terms.

19. The computer program product of claim 15, wherein determining that the first row matches the second row using a predefined matching criteria comprises determining that values in the first row match values in the second row.

* * * * *